US012596019B1

(12) United States Patent
Murray et al.

(10) Patent No.: US 12,596,019 B1
(45) Date of Patent: Apr. 7, 2026

(54) RF SPECTRUM ANALYZER USING RAYLEIGH BACKSCATTERING

(71) Applicant: The Government of the United States of America, Arlington, VA (US)

(72) Inventors: Matthew J. Murray, Alexandria, VA (US); Joseph B. Murray, Ellicott City, MD (US); Ross T. Schermer, Fairfax Station, VA (US); Jason McKinney, West Lafayette, IN (US); Brandon F. Redding, University Park, MD (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 205 days.

(21) Appl. No.: 18/603,585

(22) Filed: Mar. 13, 2024

Related U.S. Application Data

(60) Provisional application No. 63/452,213, filed on Mar. 15, 2023.

(51) Int. Cl.
G01D 5/353 (2006.01)
(52) U.S. Cl.
CPC ................................ G01D 5/35361 (2013.01)
(58) Field of Classification Search
CPC .................................................. G01D 5/35361
See application file for complete search history.

(56) References Cited

U.S. PATENT DOCUMENTS

| | | | | | |
|---|---|---|---|---|---|
| 4,699,466 | A | * | 10/1987 | Brandstetter | .......... G01R 23/17 359/308 |
| 6,307,655 | B1 | * | 10/2001 | Jelks | ...................... G01R 23/17 398/9 |

(Continued)

OTHER PUBLICATIONS

Kim et al., An Interior-Point Method for Large-Scale &1-Regularized Least Squares, IEEE Journal of Selected Topics in Signal Processing, Dec. 2007, pp. 606-617, vol. 1, No. 4, Institute of Electrical and Electronics Engineers Inc., Piscataway, NJ, USA.

(Continued)

*Primary Examiner* — Tarifur R Chowdhury
*Assistant Examiner* — Maher Yazback
(74) *Attorney, Agent, or Firm* — US Naval Research Laboratory; Suresh Koshy

(57) ABSTRACT

An apparatus receives a radio frequency ("RF") signal. The apparatus includes a first modulator encoding the RF signal on an optical carrier. The optical carrier includes a plurality of sidebands. The apparatus includes a filter operably coupled to the first modulator and passing therethrough an isolated sideband of the plurality of sidebands. The apparatus includes a Rayleigh-backscattering ("RBS") speckle spectrometer. The RBS speckle spectrometer includes a second modulator receiving the isolated sideband and modulating the isolated sideband into alternating short and long, interrogation pulses. The RF speckle spectrometer generates a first collected signal based on Raleigh backscattered light in a first polarization and a second collected signal based on Raleigh backscattered light in a second polarization. The apparatus includes a processor receiving the first collected signal and the second collected signal, and recovering therefrom the RF spectrum of the RF signal.

14 Claims, 11 Drawing Sheets

(56) References Cited

U.S. PATENT DOCUMENTS

| | | | | |
|---|---|---|---|---|
| 6,417,957 | B1 * | 7/2002 | Yao | H04B 10/2916 |
| | | | | 359/334 |
| 8,159,736 | B2 * | 4/2012 | Maleki | G02F 1/0353 |
| | | | | 359/239 |
| 9,413,372 | B1 * | 8/2016 | Valley | G01R 23/17 |
| 9,923,631 | B1 * | 3/2018 | Moilanen | H04B 17/00 |
| 11,996,889 | B2 * | 5/2024 | Buckley | H04B 10/2575 |
| 2003/0011850 | A1 * | 1/2003 | Sidorovich | G02B 27/48 |
| | | | | 398/126 |
| 2005/0025271 | A1 * | 2/2005 | Molisch | H04B 7/0691 |
| | | | | 375/347 |
| 2011/0150484 | A1 * | 6/2011 | Wang | H04B 10/25751 |
| | | | | 398/186 |
| 2012/0002972 | A1 * | 1/2012 | Stiffler | H04B 10/5165 |
| | | | | 398/115 |
| 2014/0269841 | A1 * | 9/2014 | Goodman | H04B 1/715 |
| | | | | 375/133 |
| 2014/0314005 | A1 * | 10/2014 | Sagong | H04L 5/005 |
| | | | | 370/329 |
| 2017/0222721 | A1 * | 8/2017 | Dailey | H04B 10/25752 |
| 2018/0165248 | A1 * | 6/2018 | Valley | G06E 1/00 |
| 2019/0072601 | A1 * | 3/2019 | Dzierwa | H04B 17/30 |
| 2019/0212377 | A1 * | 7/2019 | Song | G01R 23/17 |
| 2020/0069165 | A1 * | 3/2020 | Thomson | A61B 1/00009 |
| 2021/0103049 | A1 * | 4/2021 | Blanche | G01S 13/003 |

OTHER PUBLICATIONS

Donoho, David, L., Compressed Sensing, IEEE Transactions on Information Theory, Apr. 2006, pp. 1289-1306, vol. 52, No. 4, Institute of Electrical and Electronics Engineers, Piscataway, NJ, USA.

Zhang, Zhaopeng et al., A Novel Wavemeter With 64 Attometer Spectral Resolution Based on Rayleigh Speckle Obtained From Single-Mode Fiber, Journal of Lightwave Technology, Aug. 15, 2020, pp. 4548-4554, vol. 38, No. 16, Optical Society and the IEEE Photonics Society, Washington, DC, USA.

Nichols, J. M. et al., Beating Nyquist with light: a compressively sampled photonic link, Optics Express, Apr. 1, 2011, pp. 7339-7348, vol. 19, No. 8, Optica, Washington, DC, USA.

Tropp, Joel A. et al., Beyond Nyquist: Efficient Sampling of Sparse Bandlimited Signals, IEEE Transactions on Information Theory, Jan. 1, 2010, pp. 520-544, vol. 56, No. 1, Institute of Electrical and Electronics Engineers, Piscataway, NJ, USA.

Colice, Max et al., Broadband radio-frequency spectrum analysis in spectral-hole-burning media, Applied Optics, Sep. 1, 2006, pp. 6393-6408, vol. 45, No. 25, Optica, Washington, DC, USA.

Harmon, Sharon R. et al., Broadband RF disambiguation in subsampled analog optical links via intentionally-introduced sampling jitter, Optics Express, Oct. 6, 2014, pp. 23928-23937, vol. 22, No. 20, Optica, Washington, DC, USA.

Chen, Ying et al. Compressive sensing in a photonic link with optical integration, Optics Letters, Apr. 15, 2014, pp. 2222-2224, vol. 39, No. 8, Optica, Washington, DC, USA.

Valley, George C. et al., Compressive sensing of sparse radio frequency signals using optical mixing, Optics Letters, Nov. 15, 2012, pp. 4675-4677, vol. 37, No. 22, Optica, Washington, DC, USA.

Mishali, Moshe, et al., From Theory to Practice: Sub-Nyquist Sampling of Sparse Wideband Analog Signals, IEEE Journal of Selected Topics in Signal Processing, Apr. 2010, pp. 375-391, vol. 4, No. 2, Institute of Electrical and Electronics Engineers, Piscataway, NJ, USA.

Wan, Yangyang, et al., High-resolution wavemeter using Rayleigh speckle obtained by optical time domain reflectometry, Optics Letters, Feb. 15, 2020, pp. 799-802, vol. 45, No. 4., Optica, Washington, DC, USA.

Kelley, Matthew, et al., High-speed signal reconstruction for an RF spectrometer based on laser speckle imaging, Proceedings of SPIE 12420, Terahertz, RF, Millimeter, and Submillimeter-Wave Technology and Applications XVI, Mar. 13, 2023, pp. 124200L-1--124200L-9, vol. 12420, SPIE, Bellingham, WA, USA.

Bosworth, Bryan T., et al., High-speed ultrawideband photonically enabled compressed sensing of sparse radio frequency signals, Optics Letters, Nov. 15, 2013, pp. 4892-4895, vol. 38, No. 22, Optica, Washington, DC, USA.

Ghelfi, Paolo, et al., Photonics for Ultrawideband RF Spectral Analysis in Electronic Warfare Applications, IEEE Journal of Selected Topics in Quantum Electronics, Jul./Aug. 2019, p. 8900209, vol. 25, No. 4, Institute of Electrical and Electronics Engineers, Piscataway, NJ, USA.

Liew, Seng Fatt et al., Broadband multimode fiber spectrometer, Optics Letters, May 1, 2016, pp. 2029-2032, vol. 41, No. 9, Optica, Washington, DC, USA.

Valley, George C., et al., Multimode waveguide speckle patterns for compressive sensing, Optics Letters, May 23, 2016, pp. 2529-2532, vol. 41, No. 11, Optica, Washington, DC, USA.

Shmel, R. N., et al., Photonic Compressed Sensing Nyquist Folding Receiver, 2017 IEEE Photonics Conference, Orlando, FL, USA, Oct. 1, 2017, pp. 633-634, DOI: 10.1109/IPCon.2017.8116257, Institute of Electrical and Electronics Engineers, Piscataway, NJ, USA.

Borlaug, David B., et al., Photonic integrated circuit based compressive sensing radio frequency receiver using waveguide speckle, Optics Express, Jun. 21, 2021, pp. 19222-19239, vol. 29, No. 13, Optica, Washington, DC, USA.

Kravets, Vladislav, et al., Progressive compressive sensing of large images with multiscale deep learning reconstruction, Nature Portfolio Scientific Reports, May 4, 2022, vol. 12, Article No. A7228, https://doi.org/10.1038/s41598-022-11401-7, Springer Nature, Berlin, Germany.

Redding, Brandon, et al., All-fiber spectrometer based on speckle pattern reconstruction, Optics Express, Mar. 8, 2013, pp. 6584-6600, vol. 21, No. 5, Optica, Washington, DC, USA.

Berger, Perrine, et al., RF Spectrum Analyzer for Pulsed Signals: Ultra-Wide Instantaneous Bandwidth, High Sensitivity, and High Time-Resolution, Journal of Lightwave Technology, Oct. 15, 2016, pp. 4658-4663, vol. 34, No. 20, Optical Society and the IEEE Photonics Society, Washington, DC, USA.

Sefler, George A., et al., Demonstration of speckle-based compressive sensing system for recovering RF signals, Optics Express, Aug. 20, 2018, pp. 21390-21402, vol. 26, No. 17, Optica, Washington, DC, USA.

Wan, Yangyang, et al., Wavemeter Capable of Simultaneously Achieving Ultra-High Resolution and Broad Bandwidth by Using Rayleigh Speckle From Single Mode Fiber, Journal of Lightwave Technology, Apr. 1, 2021, pp. 2223-2229, vol. 39, No. 7, Optical Society and the IEEE Photonics Society, Washington, DC, USA.

* cited by examiner

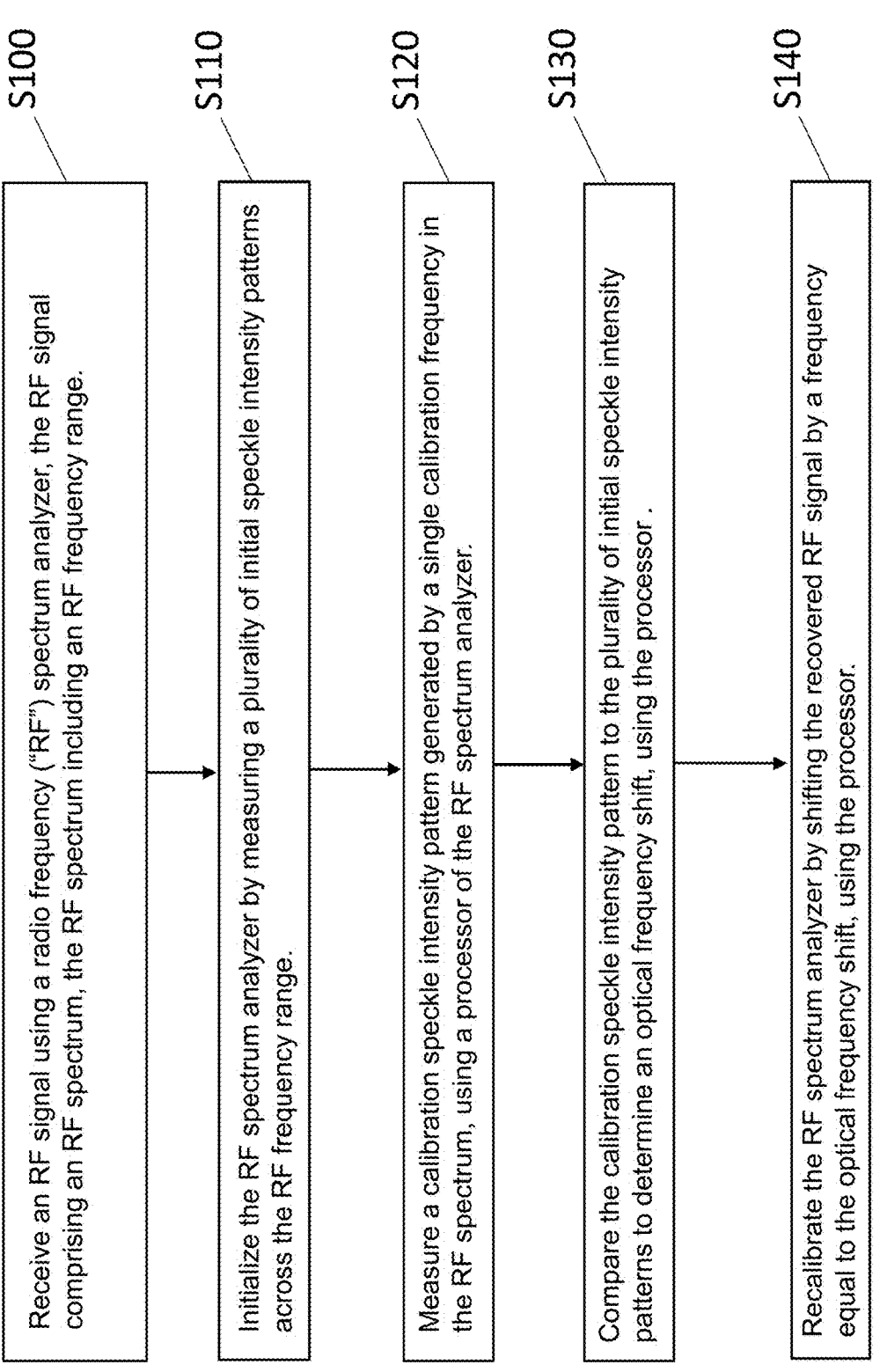

S100

Receive an RF signal using a radio frequency ("RF") spectrum analyzer, the RF signal comprising an RF spectrum, the RF spectrum including an RF frequency range.

S110

Initialize the RF spectrum analyzer by measuring a plurality of initial speckle intensity patterns across the RF frequency range.

S120

Measure a calibration speckle intensity pattern generated by a single calibration frequency in the RF spectrum, using a processor of the RF spectrum analyzer.

S130

Compare the calibration speckle intensity pattern to the plurality of initial speckle intensity patterns to determine an optical frequency shift, using the processor .

S140

Recalibrate the RF spectrum analyzer by shifting the recovered RF signal by a frequency equal to the optical frequency shift, using the processor.

FIG. 10

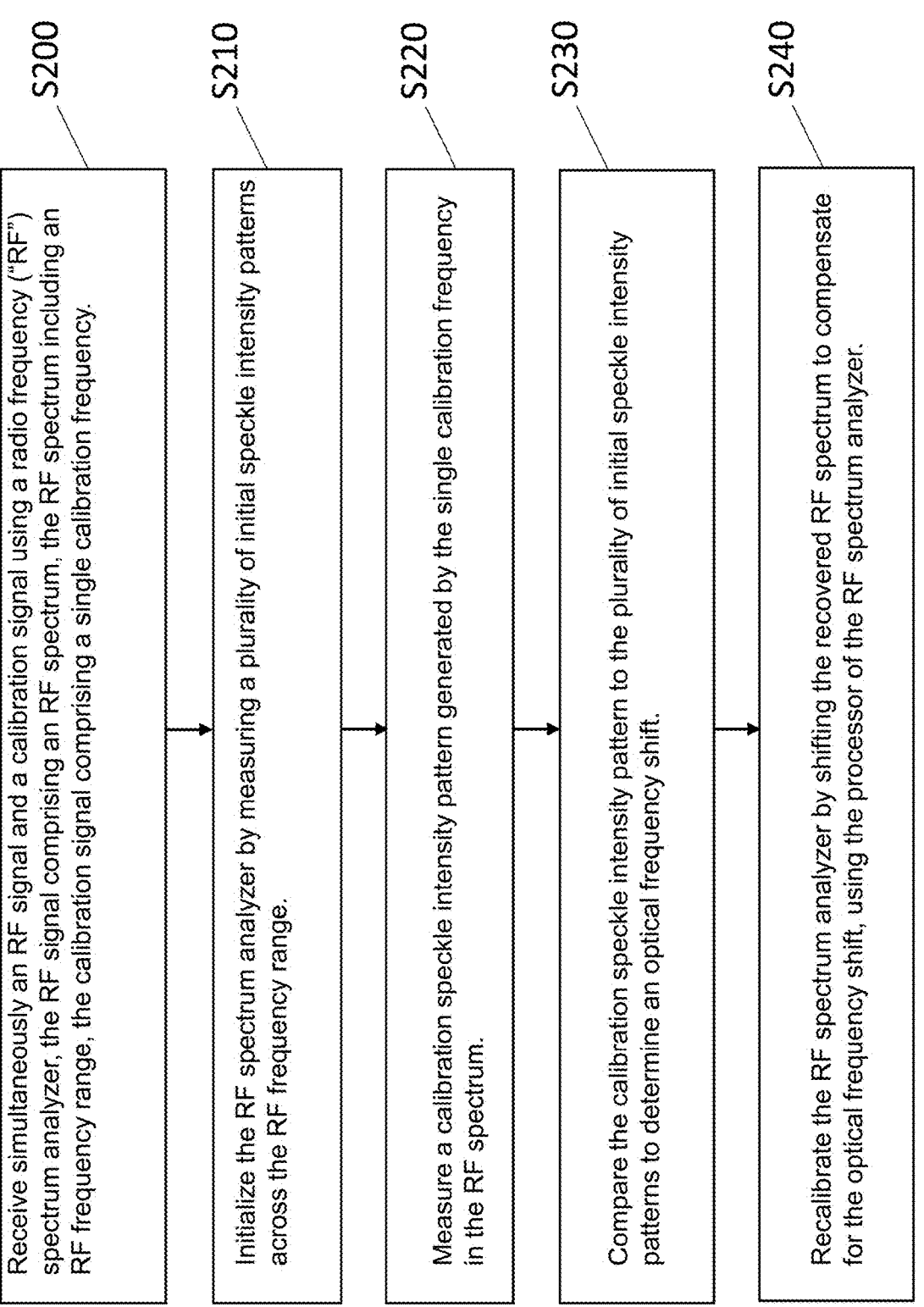

S200

Receive simultaneously an RF signal and a calibration signal using a radio frequency ("RF") spectrum analyzer, the RF signal comprising an RF spectrum, the RF spectrum including an RF frequency range, the calibration signal comprising a single calibration frequency.

S210

Initialize the RF spectrum analyzer by measuring a plurality of initial speckle intensity patterns across the RF frequency range.

S220

Measure a calibration speckle intensity pattern generated by the single calibration frequency in the RF spectrum.

S230

Compare the calibration speckle intensity pattern to the plurality of initial speckle intensity patterns to determine an optical frequency shift.

S240

Recalibrate the RF spectrum analyzer by shifting the recovered RF spectrum to compensate for the optical frequency shift, using the processor of the RF spectrum analyzer.

FIG. 11

RF SPECTRUM ANALYZER USING RAYLEIGH BACKSCATTERING

CROSS-REFERENCE TO RELATED APPLICATIONS

This Application is a non-provisional patent application of, and claims the benefit of priority under 35 U.S.C. § 119 based on, U.S. Provisional Patent Application No. 63/452, 213 filed 15 Mar. 2023. The Provisional Patent Application and all references cited therein are hereby incorporated by reference into the present disclosure in their entirety.

FEDERALLY SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; nrltechtran@us.navy.mil, referencing Navy Case No. 211,465-US2.

BACKGROUND OF THE INVENTION

Aspects of the present invention relate generally to a spectrum analyzer and, more particularly, to an RF spectrum analyzer that uses the phenomenon of Rayleigh backscattering.

Wideband (i.e., >10 GHz) instantaneous radio frequency ("RF") spectral analysis is increasingly important in the fields of wireless communications, radar systems, electronic warfare, and space exploration. However, analog-to-digital converters ("ADCs") capable of operating continuously are limited to a speed of ~1 GHz. While faster ADCs exist, the immense quantity of data collected limits these systems to recording short snapshots of the RF spectrum. Thus, conventional electronic systems can either monitor a wide swath of the RF spectrum for a short period of time, or continuously monitor a relatively narrow ~1 GHz band. Researchers have proposed a variety of electronic and optical techniques to address this trade-off.

A variety of approaches have been proposed for wideband RF detection in order to address the limited speed of real-time ADCs capable of operating continuously.

One common approach is to fold the wideband RF information into the available ~1 GHz ADC bandwidth using a Nyquist folding receiver. This scheme has been investigated both in the electronic and optical domain using optical frequency combs. While this approach allows a wideband spectrum to be monitored continuously, it has several well-known limitations: RF signals in different bands can overlap in a folding receiver; it is challenging to identify the original carrier frequency of a folded RF signal; and the folding penalty can degrade the measurement signal-to-noise ratio. Attempts to address these trade-offs (e.g., by modulating an optical frequency comb to enable carrier disambiguation) introduce additional challenges and tend to perform best when measuring sparse RF spectra.

Ultimately, RF spectrum analyzers must detect high frequency signals at sub-Nyquist sampling rates. Compressed sensing ("CS") is potentially well-suited for this type of application, particularly if the receiver has prior information that the RF spectrum is sparse in a given domain. Initially, researchers attempted to recover sparse RF spectra by sampling the spectra with a high-frequency pseudo random bit sequences ("PRBS"). As with the Nyquist folding receivers, these systems have been implemented in the electronic and optical domains. However, these systems require high bandwidth electronics and are sensitive to timing and amplitude noise in the PRBS, resulting in modest performance with resolution typically limited to ~100 MHz and restrictions on the sparsity of the signal.

While optical folding receivers and compressive sensing systems followed the same general approach as their electronic counterparts, optics has the potential to enable distinctive solutions without obvious electronic analogs. For example, researchers have used spectral hole burning to optically transfer an RF spectrum to the absorption spectrum of a crystal or encode high-resolution gratings for RF analysis. These schemes have enabled broadband operation (>10 GHz) with high resolution (~MHz), but rely on complex architectures using free-space optics and cryogenically cooled crystals.

A conceptually simpler optical approach is to encode the RF spectrum on an optical carrier and directly measure these sidebands using an optical spectrometer. However, this would require a spectrometer with ~MHz resolution, ~10 GHz of bandwidth, and a fast update rate (ideally >100 kHz). These specifications are well beyond the capabilities of traditional grating-based spectrometers, both in terms of resolution and update rate.

One approach to achieve higher resolution is to use to a "speckle spectrometer". These spectrometers use a dispersive material (e.g., multimode fiber, scattering media, or integrating spheres) to produce wavelength dependent speckle patterns that are used as fingerprints to identify the optical spectrum. This approach is also well-suited for compressed sensing problems since the dispersive material forms random projections of the optical spectrum. However, conventional speckle spectrometers rely on a camera to record the speckle pattern, which limits the measurement speed (typically <kHz). In addition, achieving spectral resolution on the order of MHz remains challenging and most systems capable of reaching this resolution are limited to detecting a single wavelength at a time (i.e., operating as a wavemeter), because this restriction allows the system to identify changes in wavelength that are much smaller than the spectral correlation width of the speckle pattern.

As a result, only a few attempts have been made to use speckle spectrometers for RF analysis. A recent work used a speckle spectrometer constructed using a 100 m multimode fiber to measure the RF spectrum encoded on an optical carrier. However, this was still restricted to ~100 MHz resolution (set by the spectral correlation width of the multimode fiber) and the camera used to record the speckle pattern limited the measurement speed to ~100 Hz. The same group also proposed a technique to de-couple the speckle spectrometer resolution from the RF resolution by first encoding the RF signal on a chirped pulse and using the speckle spectrometer to measure the spectral components of the pulse. This approach maintained ~100 MHz resolution while using a much shorter, 5 m multimode fiber and achieved high-speed operation (36 MHz) by replacing the camera with an array of 16 detectors and ADCs. However, the scheme was sensitive to the phase of the RF signal, requiring a complex calibration and reconstruction procedure that limited the number of measurable spectral channels to ~240.

SUMMARY OF THE INVENTION

An embodiment of the invention enables persistent wideband radio frequency ("RF") surveillance and spectral analysis. In this embodiment of the invention, for example, the bandwidth is not limited by the ~1 GHz bandwidth of real-time analog-to-digital converters ("ADCs").

An embodiment of the invention includes a speckle spectrometer architecture, which combines exceptionally high-resolution with a fast measurement speed. This embodiment of the invention relies on the speckle pattern formed by Rayleigh backscattered light in single-mode optical fiber, which can be recorded on a high-speed photodetector. The spectral resolution is dictated by the fiber length and pulse duration while the measurement speed is limited by the round-trip time in the fiber. This embodiment of the invention, for example, enables single tone spectral resolution as high as ~1 MHz with an update rate of 385 kHz. This combination of native resolution and measurement speed has enormous potential for RF spectral analysis.

An embodiment of the invention includes an optical RF spectrum analyzer designed for continuous, wideband operation. This embodiment of the invention encodes the RF spectrum as sidebands on an optical carrier and relies on a speckle spectrometer to measure these sidebands. To achieve the resolution and update rate required for RF analysis, this embodiment of the invention uses Rayleigh backscattering in single-mode fiber to rapidly generate wavelength-dependent speckle patterns with MHz-level spectral correlation. This embodiment of the invention further includes a dual-resolution scheme to mitigate the trade-off between resolution, bandwidth, and measurement rate. This embodiment of the invention enables continuous, wideband (15 GHz) RF spectral analysis with MHz-level resolution and a fast update rate of 385 kHz.

An embodiment of the invention includes an RF spectrum analyzer that uses a high-resolution speckle spectrometer to monitor RF sidebands encoded on an optical carrier. The spectrometer relies on a compressed sensing algorithm to recover the RF spectrum from the speckle pattern formed by Rayleigh backscattered light in a standard single mode fiber. This embodiment of the invention has tremendous potential for RF analysis due to its combination of high resolution and a fast update rate. High-resolution speckle spectrometers being extremely sensitive to environmental changes and require a trade-off between resolution and bandwidth, this embodiment of the invention includes a dual-resolution scheme to mitigate the trade-off between resolution, bandwidth, and measurement speed. This embodiment of the invention compensates for environmental drift, reducing the need for frequent re-calibration. An RF spectrum analyzer according to this embodiment of the invention is, for example, capable of continuously monitoring a 15 GHz wide spectrum with MHz-level resolution and a 385 kHz update rate. This embodiment of the invention is, for example, constructed using fiber-coupled off-the-shelf components, providing a simple and cost-effective approach to wideband RF detection.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 10 is a flowchart of a recalibration method according to an embodiment of the invention.

FIG. 11 is a flowchart of another recalibration method according to an embodiment of the invention.

DETAILED DESCRIPTION

Figure 3:
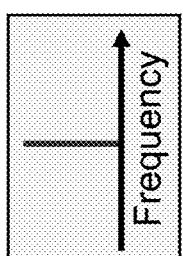
FIG. 3 is a graph of an illustrative optical carrier from a laser according to an embodiment of the instant invention.
Figure 4:
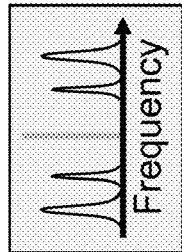
FIG. 4 is a graph of an illustrative output of an electro-optic modulator according to an embodiment of the instant invention, the electro-optic modulator output including an RF signal encoded on an optical carrier.
Figure 5:
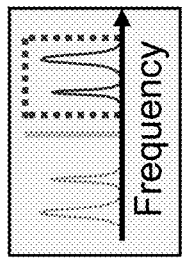
FIG. 5 is a graph of an illustrative output of a filter according to an embodiment of the instant invention, the filter output including an isolated sideband of the plurality of sidebands of the optical carrier.

An embodiment of the invention includes an apparatus and is described as follows with reference to FIGS. 1 and 2. The apparatus includes a radio frequency ("RF") spectrum analyzer 100 receiving an RF signal from an RF signal source. The RF signal, includes an RF spectrum. For the purpose of this patent application, the RF spectrum of the RF signal is a term of art and is defined as information comprising the radio frequency range and amplitudes of the RF frequencies present over which the RF spectrum analyzer operates. In operation of the apparatus, the RF signal includes zero RF tones or at least one RF tone. The RF spectrum analyzer 100 includes a standard first modulator 110 encoding the RF signal on an optical carrier, as shown by way of illustration in FIG. 3. The optical carrier is generated by a standard laser 120. The optical carrier includes a plurality of sidebands as shown by way of illustration in FIG. 4. The RF spectrum analyzer 100 includes a standard filter 130 operably coupled to the first modulator 110 and passing therethrough an isolated sideband of the plurality of sidebands, as shown by way of illustration in FIG. 5.

Figure 6:
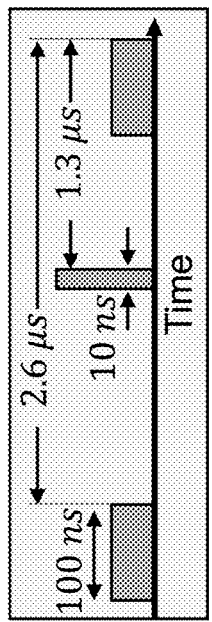
FIG. 6 is a graph of illustrative short and long interrogation pulses.

The RF spectrum analyzer 100 includes a Rayleigh-backscattering ("RBS") speckle spectrometer 140. The RBS speckle spectrometer 140 includes a second modulator 150 receiving the isolated sideband and modulating the isolated sideband into alternating short and long, interrogation pulses, as shown by way of illustration in FIG. 6. In an embodiment of the invention, high resolution over a large number of spectral channels is desired. A short interrogation pulse gives many measurements (i.e., speckle intensity pattern features) and therefore a large number of spectral channels, but poor resolution. A long interrogation pulse gives few measurements and therefore few channels, but high resolution.

The spectrum is recovered from the short and long pulse data using a standard compressed sensing algorithm. Accordingly, the spectrum can be recovered using compressed sensing provided that the spectrum is sparse. For the purpose of this patent application, sparse is a term of art and is defined as discussed in DONOHO, David, L., Compressed Sensing, IEEE Transactions on Information Theory, April 2006, pp. 1289-1306, Vol. 52, No. 4, Institute of Electrical and Electronics Engineers, Piscataway, NJ, USA, which is incorporated herein by reference. In compressed sensing, the number of measurements is less than the amount of information being recovered (M<N), but the technique works best if M≅N. Performance continually decreases as M gets further away from N.

The dual resolution scheme uses two pulse durations to address the above-mentioned trade-off between resolution and number of spectral channels. The relative length of the pulses is such that $\tau_{long} > \tau_{short}$. One of ordinary skill in the art will readily appreciate that, if the pulse durations are close to one another, then there is not much benefit to using the dual resolution scheme. Similarly, one of ordinary skill in the art will readily appreciate that, if the pulses are too different from one another, then the benefit of using the dual resolution scheme is also decreased because the coarse resolution of the long pulse is not sufficient to select an appropriately narrow frequency band of interest. So, there is a continuum of performance benefit with an optimum somewhere in the middle, but the exact point depends on the application. For many applications, a factor of about 5-50 times different (i.e., $$\frac{\tau_{long}}{\tau_{short}} \approx 5 \text{ to } 50$$

ends up being best.

How to choose interrogation pulse duration is as follows. Compressed sensing recovers N pieces of information from M measurements, where M<N*. Compressed sensing works best if M≅N, or, to put it another way, if the ratio $$\frac{N}{M} \sim 1.$$

The ratio can be defined as a compression ratio $$K = \frac{N}{M}.$$

The length of the short and long pulses depends on the desired bandwidth $\Delta F$ over which the spectrometer detects signals and the desired resolution $\delta f$ with which the spectrometer detects those signals, and the measurement rate $f_{rep}$. The achievable resolution $\delta f$ for a given pulse duration $\tau$ is roughly: $\delta f = 1/\tau$. So, for a 10 ns pulse, $\delta f = 100$ MHz. One of ordinary skill in the art will readily appreciate that, in practice, the resolution can actually be much better (i.e., less) than $1/\tau$ with sufficient signal-to-noise.

(a) The number of spectral channels N is given by:

$$N = \frac{\Delta F}{\delta f}.$$

(b) The number of measurements for a given pulse duration is given by:

$$M = \frac{\left(\frac{2nL}{c}\right)}{\tau} = \frac{1}{\tau f_{rep}}.$$

(c) The compression ratio is preferably less than some value k (e.g., k is around 5 or so):

$$\frac{N}{M} < k.$$

Plugging (b) into (c) yields:

$$\frac{1}{N f_{rep}} < \tau < \frac{k}{N f_{rep}},$$

where the lower bound enforces the constraint that M<N. For the short interrogation pulse, $$N_{short} = \frac{\Delta F}{\delta f_{short}} = \Delta F \tau_{short}$$

$$\frac{1}{N_{short} f_{rep}} < \tau_{short} < \frac{k}{N_{short} f_{rep}},$$

where $$f_{rep} = \frac{c}{2nL},$$

and $$\sqrt{\frac{1}{\Delta F f_{rep}}} < \tau_{short} < \sqrt{\frac{k}{\Delta F f_{rep}}}.$$

For the long interrogation pulse, there is a reduced bandwidth $\Delta F_r$, but higher resolution, such that $$N_{long} < N_{short}: N_{long} = \frac{\Delta F_r}{\delta f_{long}}.$$

$$\tau_{short} < \tau_{long} < \frac{k}{N_{long} f_{rep}}$$

One of ordinary skill in the art will readily appreciate that the above illustrative description of determining the long interrogation pulse is an estimate of $\tau_{long}$ because the reduced bandwidth can be variable, and the compression ratio for the long interrogation pulse need not be the same as that for the short interrogation pulse.

The RBS speckle spectrometer 140 includes a standard first amplifier 160 amplifying the modulated, isolated sideband. The RBS speckle spectrometer 140 includes a standard optical fiber 170 receiving the alternating short and long, interrogation pulses, Rayleigh backscattered light propagating through the fiber in a direction opposite to that of the alternating short and long, interrogation pulses. The RBS speckle spectrometer 140 includes a standard first photodetector 180 operably coupled to the optical fiber 170 and collecting therefrom the Raleigh backscattered light in a first polarization. The first photodetector 180 generates a first collected signal based on the Raleigh backscattered light in the first polarization. The RBS speckle spectrometer includes a standard second photodetector 190 operably coupled to the 170 optical fiber and collecting therefrom the Raleigh backscattered light in a second polarization, the second polarization differing from the first polarization. The second photodetector 190 generates a second collected signal based on the Raleigh backscattered light in the second polarization.

Optionally, the RF spectrum analyzer 100 further includes a standard processor 200 receiving the first collected signal and the second collected signal, and recovering therefrom the RF spectrum.

Optionally, the laser 120 includes a standard narrow linewidth laser transmitting the optical carrier to the first modulator 110.

Optionally, the filter 130 includes a standard tunable bandpass filter.

Optionally, the optical fiber 170 includes a standard single-mode optical fiber or a standard multi-mode optical fiber.

Optionally, the optical fiber 170 includes a fiber length, wherein the short and long, interrogation pulses are separated by a pulse separation corresponding to the fiber length. For the purpose of this patent application, the pulse separation corresponds to the fiber length such that pulses are separated by at least $$t_{sep} = \frac{2nL}{c},$$

where n is the fiber refractive index, L is the fiber length, and c is the speed of light.

Optionally, the RBS speckle spectrometer 140 further includes a standard second amplifier 210 receiving the Rayleigh backscattered light from the optical fiber 170 and amplifying the Rayleigh backscattered light. Optionally, the first amplifier 160 and the second amplifier 210 include standard erbium-doped fiber amplifiers.

Figure 7:
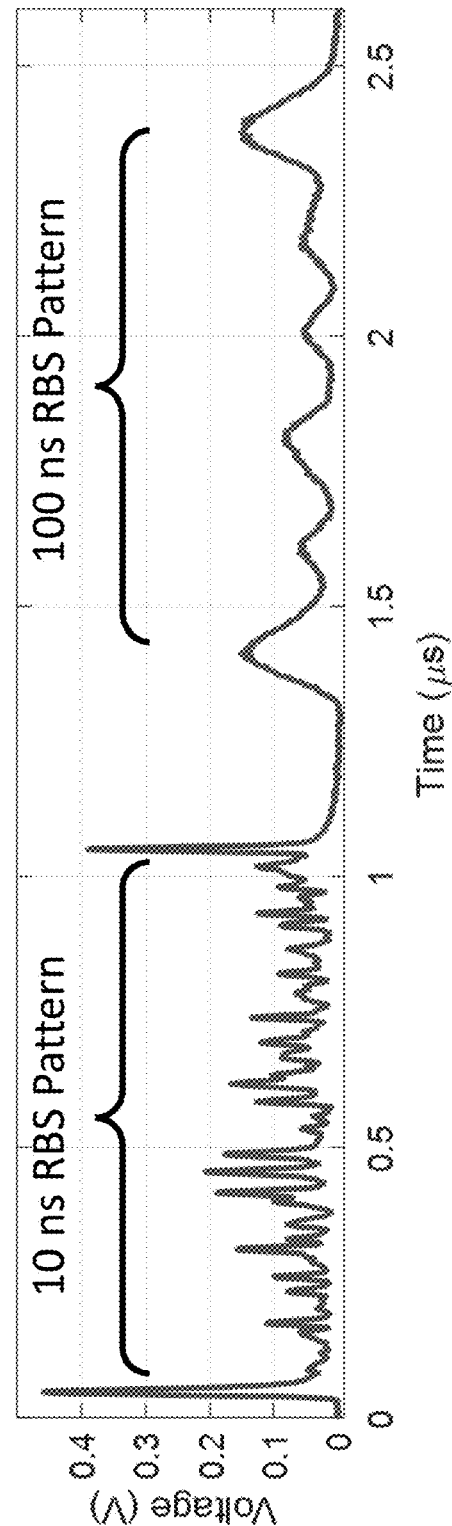
FIG. 7 is a graph of an illustrative speckle pattern.

Optionally, the RBS speckle spectrometer 140 further includes a standard circulator 220 coupled to the optical fiber 170. The Rayleigh backscattered light generated in the optical fiber 170 is coupled out of the optical fiber. The RBS speckle spectrometer 140 also includes a standard polarizing beam splitter 230 coupled to the circulator 220 and receiving the Rayleigh backscattered light from the circulator. The polarizing beam splitter 230 transmits light with a first polarization to the first photodetector 180. The polarizing beam splitter 230 transmits light with a second polarization to the second photodetector 190. FIG. 7 shows by way of illustration a typical speckle intensity pattern, as recorded by one of the photodetectors 180, 190.

Optionally, the processor 200 recovers the RF spectrum from the first collected signal and the second collected signal using compressed sensing. For the purpose of this patent application, compressed sensing and compressive sensing are synonymous.

Optionally, the first collected signal includes first short pulse data and first long pulse data. The second collected signal includes second short pulse data and second long pulse data. The processor recovers the RF spectrum by: recovering a coarse resolution spectrum from the first short pulse data and the second short pulse data; identifying regions in the coarse resolution spectrum with the at least one RF tone; and recovering a fine resolution spectrum from the first long pulse data and the second long pulse data in the regions in the coarse resolution spectrum with the at least one RF tone. The fine resolution spectrum is the recovered RF spectrum.

Another embodiment of the invention includes a recalibration method for an RF spectrum analyzer and is described as follows with reference, by way of illustration, to FIGS. 1-2 and 10. An RBS speckle intensity pattern, based on the above-mentioned first collected signal and the second collected signal, is a unique pattern specific to a particular wavelength of light. However, the speckle intensity pattern can change with changes in the environment (e.g., temperature drift, pressure drift, and/or strain changes). To initially calibrate a conventional spectrometer, it is necessary to measure the speckle intensity pattern at all frequencies of light to be measured; then, to recalibrate the conventional spectrometer, it is necessary to measure all possible speckle patterns again after any change in the environment. Applicant recognized that Rayleigh backscatter speckle intensity patterns offer a way to avoid this lengthy re-calibration because changes in the environment (e.g., temperature drift, pressure drift, and/or strain changes) have the same effect that optical frequency has on the speckle intensity pattern.

Figure 1:
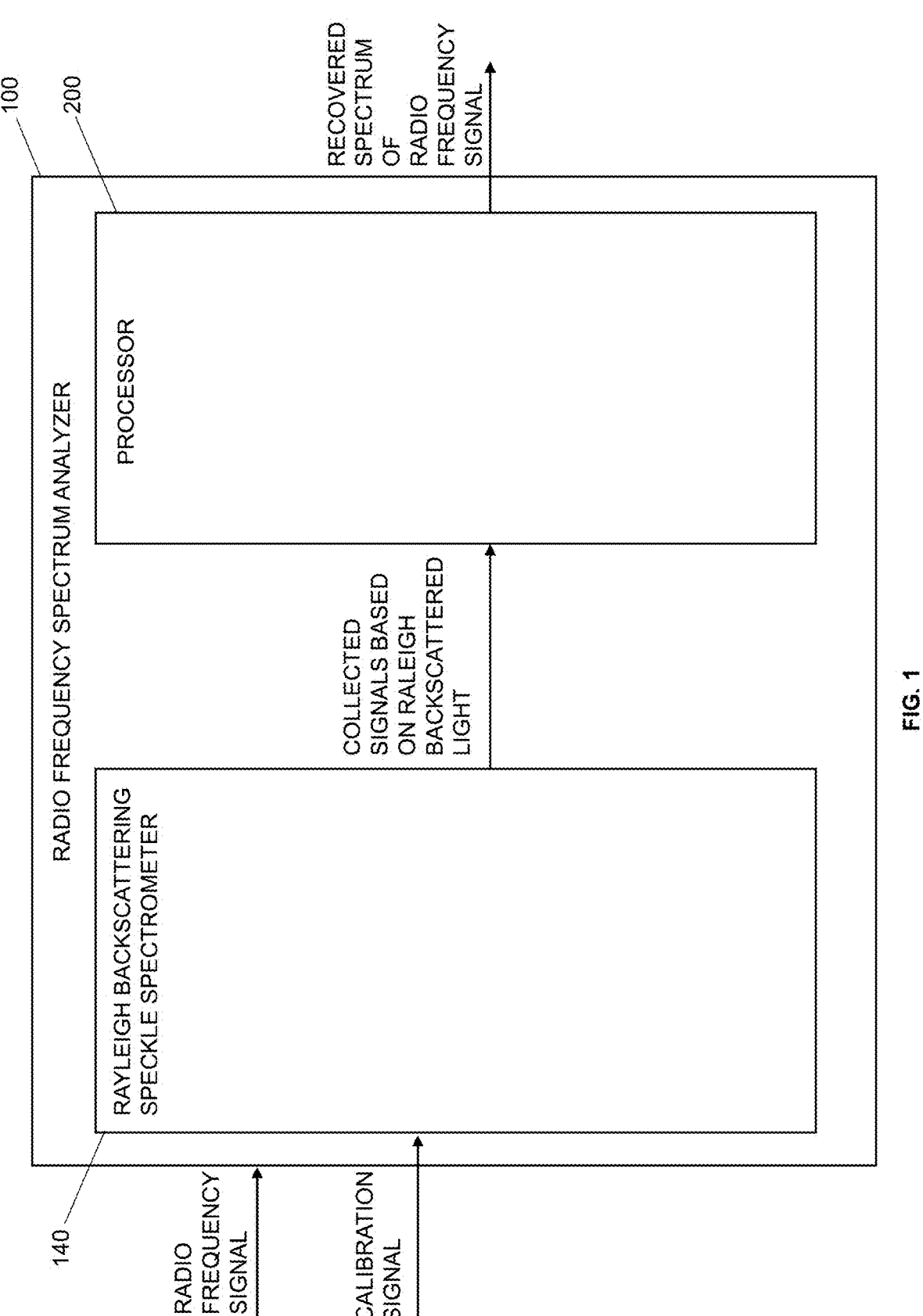
FIG. 1 is a block diagram of an apparatus according to an embodiment of the instant invention.
Figure 2:
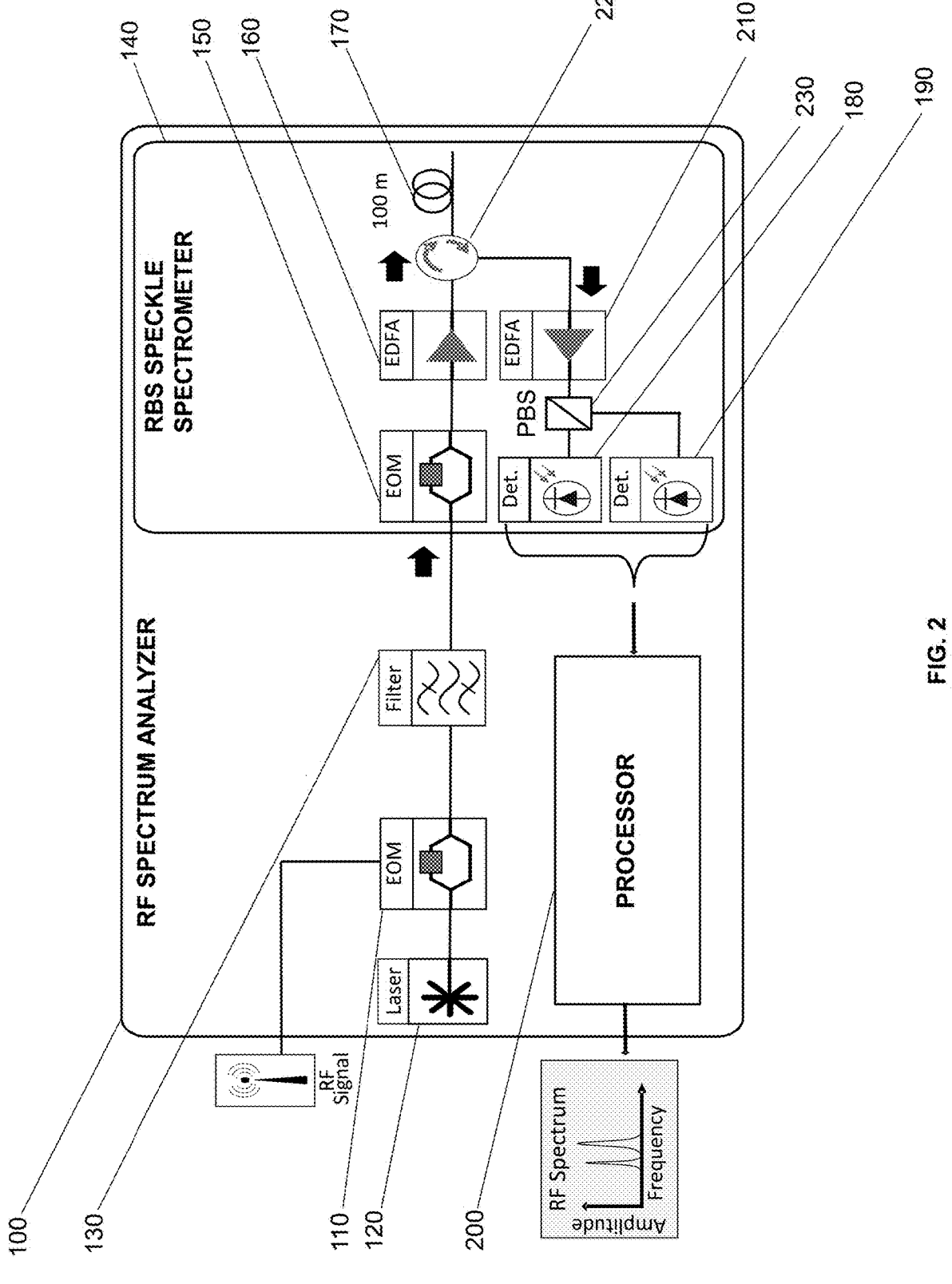
FIG. 2 is a schematic diagram of an apparatus according to an embodiment of the instant invention.

The method according to this embodiment of the invention includes providing the RF spectrum analyzer 100, such as shown by way of illustration in FIGS. 1-2 and 10. The RF spectrum analyzer 100 receives an RF signal, for example, as shown in Step S100. The RF signal includes at least one RF tone and an RF spectrum. The RF spectrum includes an RF frequency range. The RF spectrum analyzer 100 includes a RBS speckle spectrometer 140, and a processor 200 communicating with the RBS speckle spectrometer 140 and recovering the RF spectrum. The method further includes initializing the RF spectrum analyzer 100 by measuring a plurality of initial speckle intensity patterns across the RF frequency range, for example, as shown in Step S110. The method further includes measuring a calibration speckle intensity pattern generated by a single calibration frequency in the RF spectrum, using the processor, for example, as shown in Step S120. The method further includes comparing the calibration speckle intensity pattern to the plurality of initial speckle intensity patterns to determine an optical frequency shift, using the processor, for example, as shown in Step S130. Differences in the calibration speckle intensity pattern as compared to the corresponding initial speckle intensity pattern for the same calibration frequency are caused by environmental changes (e.g., temperature drift, pressure drift, and/or strain) to the RF spectrum analyzer between the measurement of the plurality of initial speckle intensity patterns and the measurement of the calibration speckle intensity pattern. The optical frequency shift is the difference between the calibration frequency and the optical frequency required to generate the initial speckle intensity pattern that is identical to the calibration speckle intensity pattern. The method further includes recalibrating the RF spectrum analyzer by shifting the recovered RF spectrum by a frequency equal to the optical frequency shift, using the processor, for example, as shown in Step S140.

Optionally, the RF spectrum analyzer 100 includes a standard first modulator 110 encoding the RF signal on an optical carrier. The optical carrier includes a plurality of sidebands. The RF spectrum analyzer 100 includes a standard filter 130 operably coupled to the first modulator 110 and passing therethrough an isolated sideband of the plurality of sidebands.

The RF spectrum analyzer 100 includes a RBS speckle spectrometer 140. The RBS speckle spectrometer 140 includes a standard second modulator 150 receiving the isolated sideband and modulating the isolated sideband into alternating short and long, interrogation pulses. The RBS speckle spectrometer 140 includes a standard first amplifier 160 amplifying the modulated, isolated sideband. The RBS speckle spectrometer 140 includes a standard optical fiber 170 receiving the alternating short and long, interrogation pulses, Rayleigh backscattered light propagating through the optical fiber in a direction opposite to that of the alternating short and long, interrogation pulses. The RBS speckle spectrometer 140 includes a standard first photodetector 180 operably coupled to the optical fiber 170 and collecting therefrom Raleigh backscattered light in a first polarization. The first photodetector 180 generates a first collected signal based on the Raleigh backscattered light in the first polarization. The RBS speckle spectrometer 140 includes a standard second photodetector 190 operably coupled to the optical fiber 170 and collecting therefrom Raleigh backscattered light in a second polarization. The second photodetector 190 generates a second collected signal based on the Raleigh backscattered light in the second polarization.

Optionally, the RF spectrum analyzer 140 further includes a processor 200 receiving the first collected signal and the second collected signal, and recovering therefrom the RF spectrum.

Another embodiment of the invention includes another recalibration method for an RF spectrum analyzer and is described as follows with reference, by way of illustration, to FIGS. 1-2 and 11. The method includes providing a RF spectrum analyzer 100 receiving simultaneously an RF signal and a calibration signal, for example, as shown in Step S200. The RF signal includes at least one RF tone and an RF spectrum. The RF spectrum includes an RF frequency range. The calibration signal includes a single calibration frequency. The RF spectrum analyzer 100 includes a RBS speckle spectrometer 140, and a processor 200 communicating with the RBS speckle spectrometer and recovering the RF spectrum. The method further includes initializing the RF spectrum analyzer 100 by measuring a plurality of initial speckle intensity patterns across the RF frequency range, for example, as shown in Step S210. The method further includes measuring a calibration speckle intensity pattern generated by the single calibration frequency in the RF spectrum, for example, as shown in Step S220. The method further includes comparing the calibration speckle intensity pattern to the plurality of initial speckle intensity patterns to determine an optical frequency shift, for example, as shown in Step S230. The optical frequency shift is caused by environmental changes (e.g., temperature drift, pressure drift, and/or strain) to the RF spectrum analyzer 100 between the measurement of the plurality of initial speckle intensity patterns and the measurement of the calibration speckle intensity pattern. The method further includes recalibrating the RF spectrum analyzer 100 by shifting the recovered RF spectrum to compensate for the optical frequency shift, using the processor 200, for example, as shown in Step S240.

Optionally, the RF spectrum analyzer 100 includes a standard first modulator 110 encoding the RF signal on an optical carrier. The optical carrier includes a plurality of sidebands. The RF spectrum analyzer 100 includes a standard filter 130 operably coupled to the first modulator 130 and passing therethrough an isolated sideband of the plurality of sidebands.

The RF spectrum analyzer 100 includes a RBS speckle spectrometer 140. The RBS speckle spectrometer 140 includes a standard second modulator 150 receiving the isolated sideband and modulating the isolated sideband into alternating short and long, interrogation pulses. The RBS speckle spectrometer 140 includes a standard first amplifier 160 amplifying the modulated, isolated sideband. The RBS speckle spectrometer 140 includes a standard optical fiber 170 receiving the alternating short and long, interrogation pulses, Rayleigh backscattered light propagating through the optical fiber in a direction opposite to that of the alternating short and long, interrogation pulses. The RBS speckle spectrometer 140 includes a standard first photodetector 180 operably coupled to the optical fiber 170 and collecting therefrom Raleigh backscattered light in a first polarization. The first photodetector 180 generates a first collected signal based on the Raleigh backscattered light in a first polarization. The RBS speckle spectrometer 140 includes a standard second photodetector operably coupled to the optical fiber 170 and collecting therefrom Raleigh backscattered light in a second polarization. The second photodetector 190 generates a second collected signal based on the Raleigh backscattered light in a second polarization.

Optionally, the RF spectrum analyzer further includes a processor receiving the first collected signal and the second collected signal, and recovering therefrom the RF spectrum.

Another embodiment of the invention includes an apparatus, which is describes follows with reference to FIGS. 1 and 2. The apparatus includes an RF spectrum analyzer 100. The RF spectrum analyzer 100 operates by encoding an RF spectrum onto an optical carrier (e.g. using a standard first electro-optic modulator 110) and using a RBS speckle spectrometer 140 to record the resulting optical spectrum. In designing the spectrometer to meet the requirements for wideband RF analysis, the spectrometer ideally provides ~MHz resolution over a bandwidth of at least 10 GHz while maintaining a fast update rate (>100 kHz).

In the RBS speckle spectrometer 140, the optical signal under test is modulated into a short pulse and injected into a standard single mode fiber 170. The Rayleigh backscattered light from the optical fiber 170 is then measured as a function of time, providing the speckle pattern that will be used to recover the input spectrum. As in any speckle spectrometer, a calibration step is required to construct a transfer matrix, T. The transfer matrix is an $M_t \times N_f$ matrix that converts the input spectrum, S (described as a vector with $N_f$ spectral channels), to the measured speckle pattern, I (described as a vector containing $M_t$ temporal samples). Calibration is performed by recording the speckle pattern formed by each spectral channel in S to construct T one column at a time. In an embodiment of the invention, a standard compressed sensing approach is used to recover the input spectrum, S, from the measured speckle pattern, I, by solving the following minimization problem:

$$\operatorname*{argmin}_{s}\left[\|TS - I\|_2^2 + \gamma\|S\|_1\right], \tag{1}$$

where $\gamma$ is the sparsity parameter. The ratio of the number of spectral channels to the number of temporal measurements defines the compression ratio: $N_f/M_t$. In general, a lower compression ratio will enable a more accurate spectral reconstruction and reduce the computational time required to recover the spectrum.

The resolution, bandwidth, and measurement rate of the RBS spectrometer is, for example, adjusted by selecting the pulse duration and the fiber length. The pulse duration, r, dictates the spectral resolution of the spectrometer since the spectral correlation width of the speckle pattern, $\delta f$, scales as $\delta f \sim 1/\tau$. The length of the fiber, L, determines the measurement rate: $f_{meas} = (c/n)/(2L)$, as well as the number of measured temporal channels, or speckle grains, which is $M_t \cong 2$ $nL/(c\tau)$, where c is the speed of light and n is the effective index in the fiber. The measurement bandwidth, $\Delta F$, depends on the acceptable compression ratio and is limited to $\Delta F = N_f \delta f \cong (N_f/M_t)[2 \ nL/(c\tau^2)]$.

Based on these expressions, an RBS speckle spectrometer with the desired resolution, bandwidth, and update rate can be constructed. For example, an RBS speckle spectrometer with a 1 MHz resolution, 10 GHz bandwidth, and 100 kHz update rate requires a pulse duration of $\tau \sim 1 \ \mu s$ while the update rate limits the fiber length to $L \sim 1$ km. Unfortunately, this results in a speckle pattern containing $M_t \sim 10$ speckle grains and requires an unrealistic compression ratio of $\sim 1000$ to recover the $N_f \sim 10^4$ spectral channels needed to support a bandwidth of 10 GHz.

In order to mitigate this trade-off between spectral resolution and bandwidth, a dual-resolution scheme according to an embodiment of the invention is introduced in which the optical fiber 170 is probed with a short interrogation pulse followed by a longer interrogation pulse. In an embodiment of the invention, the speckle intensity pattern produced by the short pulse is used to obtain a broadband measurement with modest resolution while the speckle pattern produced by the long pulse is used to improve the resolution of the spectrum obtained with the short pulse. Provided the RF spectrum is relatively sparse, the short-pulse can be used to screen the overall spectrum for regions where RF signals are present so that the search bandwidth (and compression ratio) can be reduced when the long pulse data is used to improve the resolution.

The RF spectrum analyzer according to an embodiment of the invention is shown by way of illustration in FIG. 2. Light from a standard narrow linewidth laser (e.g., <10 Hz, OEwaves' OE4028 laser) is directed to a first standard electro-optic modulator ("EOM") 110. The first EOM 110 is driven by the RF signal under test in dual-sideband suppressed-carrier mode, creating two copies of the RF signal. A standard filter 130 (e.g., a standard tunable bandpass filter) is used to select a band from 5 to 20 GHz above the original laser frequency. The optical signal carrying the RF information is then coupled into the RBS speckle spectrometer 140, shown by way of illustration in FIG. 2

Within the RBS speckle spectrometer 140, the optical signal is modulated into alternating short and long interrogation pulses (e.g., 10 and 100 ns pulses, respectively) using a standard second EOM 160. The pulses are separated by, for example, 1.3 μs, as shown by way of illustration in FIG. 6. This pulse separation is slightly longer than required based on the 100 m fiber length in order to clearly separate the speckle patterns formed by the two pulses. The modulator transmission is adjusted so that the 100 ns pulse had ~30% of the peak power of the 10 ns pulse. This ensures that the RBS speckle pattern from each pulse would have similar power levels, because the RBS power is dictated by the input peak power and pulse duration. The interrogation pulses are amplified, for example, to an average power of ~2 mW using a standard amplifier (e.g., a standard Er-doped fiber amplifier ("EDFA") 160) and directed into 100 m of standard single mode fiber (SMF-28e+) via a standard circulator. Optionally, the fiber is placed in an insulated metal box to reduce the environmental fluctuations, such as temperature fluctuations. The RBS speckle pattern is amplified using a second EDFA 210 and directed through a standard polarizing beam splitter ("PBS") 230 onto a pair of standard photodetectors 180, 190 (e.g., standard 125 MHz photodetectors) and recorded at, for example, 1 GS/s. An illustrative speckle pattern recorded on one of the photodetectors is shown by way of illustration in FIG. 7. In the illustrative speckle pattern of FIG. 7, the first ~1 μs contains the speckle pattern produced by the 10 ns pulse, revealing a dense speckle pattern, while the speckle pattern produced by the 100 ns pulse contains far fewer speckle grains.

To operate the RBS spectrometer according to an embodiment of the invention, the transfer matrices associated with the 10 ns and 100 ns pulses are initially calibrated. This is accomplished by recording the speckle patterns formed while driving the EOM at frequencies from, for example, 5 GHz to 20 GHz in steps of 1 MHz, using, for example, a standard RF signal generator. As expected, the 10 ns pulse produced speckle patterns with more temporal features, but a larger spectral correlation width than the 100 ns pulse. The spectral correlation width associated with both transfer matrices is calculated. The 10 ns pulse produced speckle patterns with a half-width at half-maximum ("HWHM") spectral correlation width of ~30 MHz while the 100 ns pulse produced speckle patterns with a ~3 MHz correlation width, following the expected $1/\tau$ dependence.

The measured transfer matrices are oversampled along both the frequency and time axes. To reduce the amount of correlated data, a low pass filter in the time domain with a passband set at $1/\tau$ is applied. For example, the 10 ns transfer matrix is then sub-sampled every 4 ns and the 100 ns transfer matrix every 25 ns. For example, the 10 ns transfer matrix in the frequency domain is also sub-sampled at a step size of 20 MHz (just below the spectral correlation width). The specular reflections from the beginning and end of the fiber are discarded. Finally, the speckle patterns recorded in each polarization state are stitched together. For example, this results in a 10 ns transfer matrix with dimensions $N_f = 750$ spectral channels and $M_t = 180$ uncorrelated temporal channels, enabling a coarse reconstruction of the 15 GHz measurement bandwidth with a modest compression ratio of ~4. For example, the 100 ns transfer matrix has dimensions $N_f = 1.5 \times 10^4$ and $M_t = 15$. In practice, the number of spectral channels used in the 100 ns transfer matrix is reduced depending on the bands that contain RF signals, determined using the initial coarse reconstruction. For example, if the coarse reconstruction identifies RF signals in three of the 20 MHz bands, then the fine reconstruction would only be required to search 60 MHz of bandwidth, resulting in a compression ratio of 4. As another example, if the entire 15 GHz bandwidth is reconstructed with the fine resolution transfer matrix, then the compression ratio would be 1000.

After calibration, the ability of the RF spectrum analyzer according to an embodiment of the invention to recover an unknown RF signal is, for example, tested as follows. As with the calibration measurement, the recorded speckle patterns are low pass filtered at $1/\tau$ for each pulse duration. The filter removes highly correlated information, accelerating the spectral reconstruction. The filter removes the effect of interference between nearby tones in the RF spectrum. In the RBS spectrometer according to an embodiment of the invention, interference signals between RF tones separated by less than the 125 MHz detector bandwidth introduce oscillations in the measured speckle pattern. Because the compressed sensing formulation in Eq. (1) assumes the speckle patterns produced by distinct frequencies add incoherently, a low-pass filter is, for example, required to remove the interference signal. This has implications for the minimum resolvable separation between two RF tones.

Figure 8:
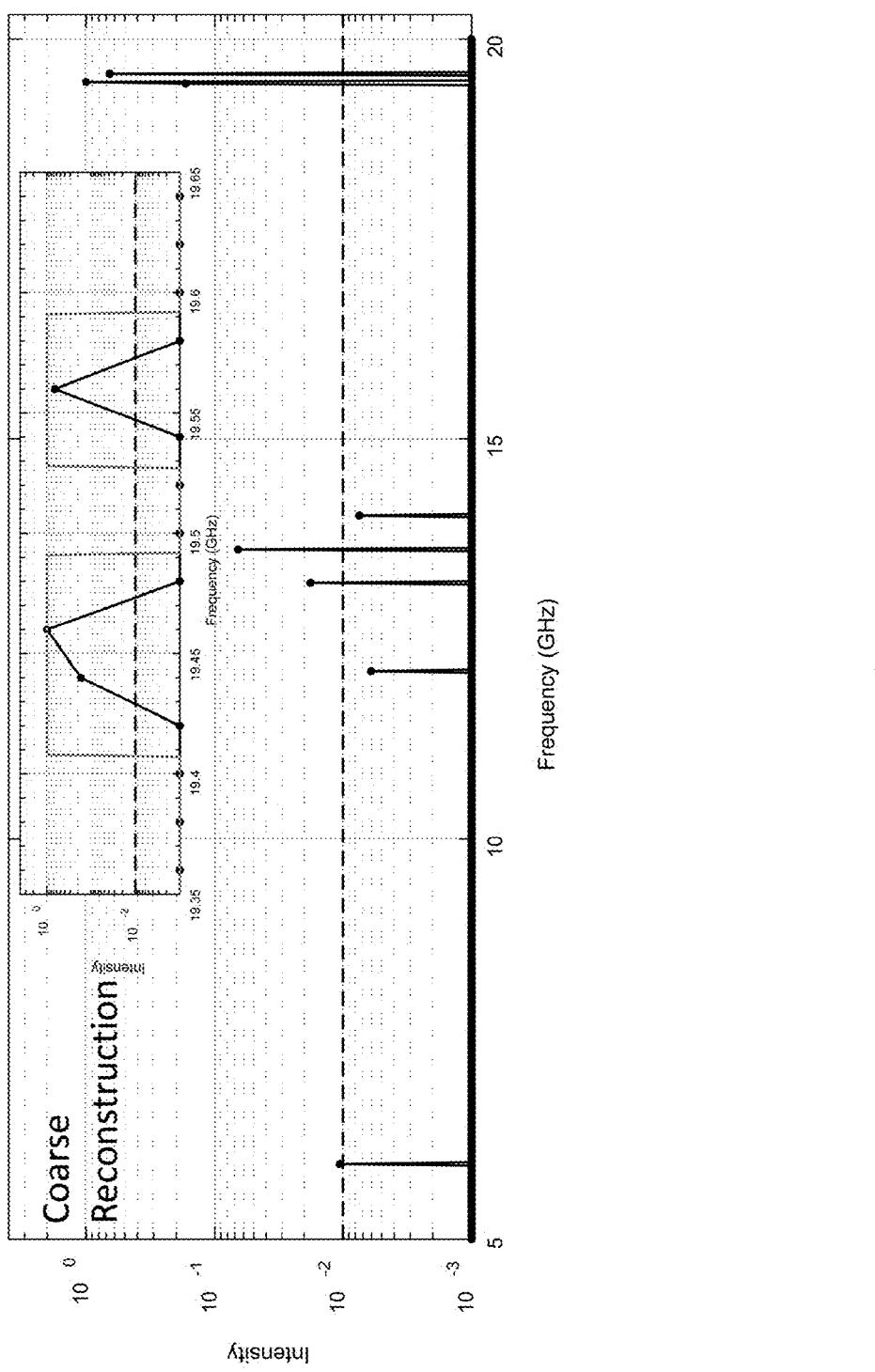
FIG. 8 is a graph of illustrative recovered RF spectrum after coarse reconstruction, which graph identifies spectral regions containing RF signals.

As an example of an embodiment of the invention in operation, an RF spectrum consisting of two tones separated by 100 MHz at 19.45 GHz and 19.55 GHz is measured as follows. A 10 ns speckle pattern is used to obtain a coarse measurement of the RF spectrum. Eq. (1) is solved, for example, using a standard lasso algorithm as described in KIM et al, An Interior-Point Method for Large-Scale $l_1$-Regularized Least Squares, IEEE Journal of Selected Topics in Signal Processing, December 2007, pp. 606-617, Vol. 1, No. 4, Institute of Electrical and Electronics Engineers Inc., Piscataway, NJ, USA, which is incorporated herein by reference. The algorithm constrains the elements of S to be nonnegative. FIG. 8 shows an illustrative recovered spectrum revealing two tones near 19.5 GHz. This coarse measurement does not have the resolution to accurately identify the two underlying frequencies; however, it was able to successfully identify the spectral regions containing RF signals. This coarse spectrum is used to select the spectral bands to search using the 100 ns speckle pattern. To do this, any spectral channel within 20 MHz of an RF signal that was above a normalized threshold value of 0.01 (this threshold being set by the dynamic range of the RBS spectrometer) is selected. The gray lines in the inset of FIG. 8 show the spectral bands that were used to obtain the fine-resolution spectrum.

Figure 9:
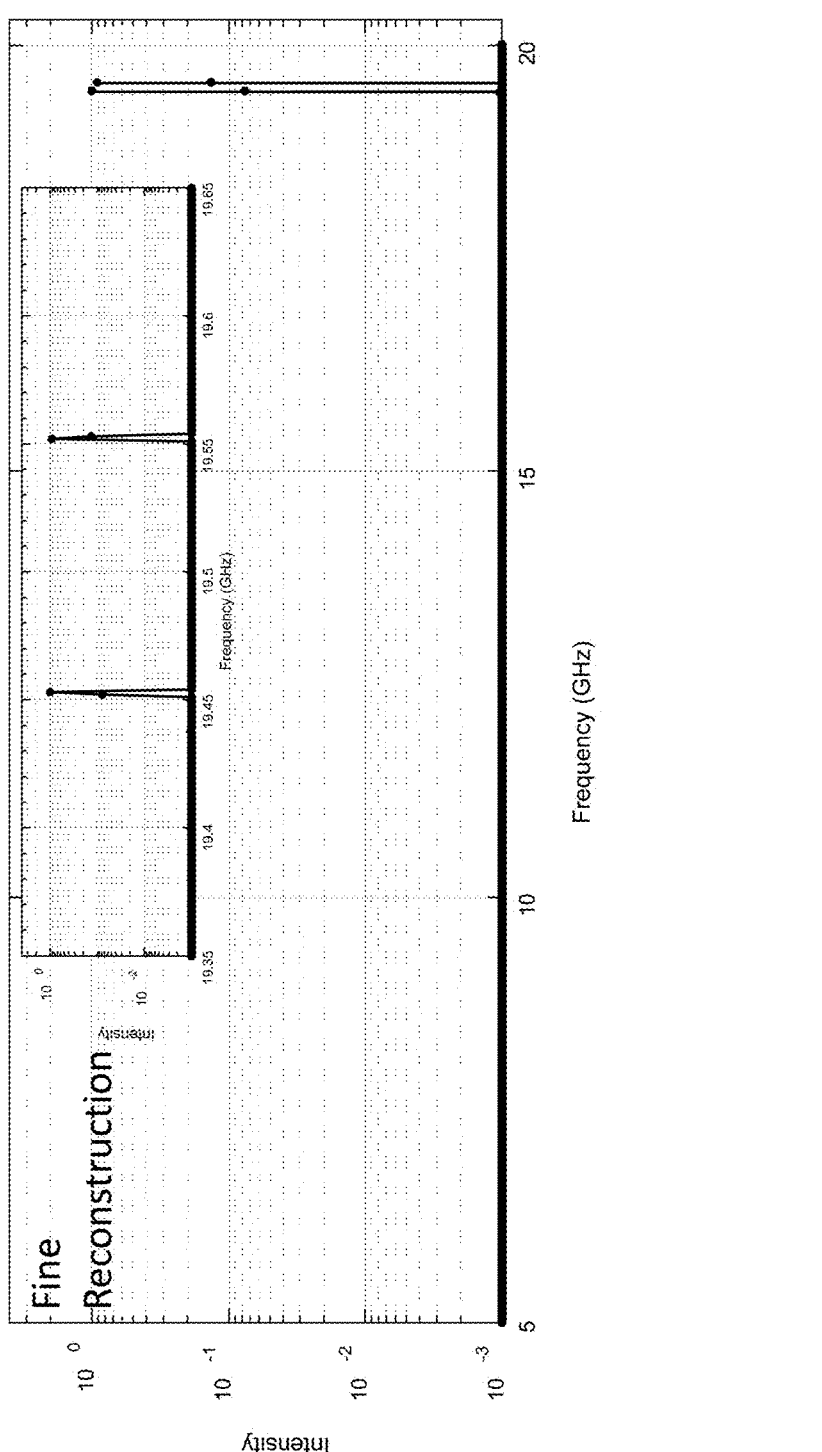
FIG. 9 is a graph of an illustrative recovered RF spectrum after fine reconstruction was restricted to the spectral regions indicated after coarse reconstruction, the recovered RF spectrum after the fine reconstruction revealing two lines separated by 100 MHz.

To reconstruct the fine resolution spectrum, in an embodiment of the invention, a subset of the original 100 ns transfer matrix that only contained the frequency bands identified in the coarse reconstruction is used. The 100 ns speckle pattern is then provided to the same lasso algorithm to recover a high-resolution spectrum in the selected frequency bands. The spectral components outside these regions are set to 0. Even though the coarse reconstruction identifies two possible RF signals near 13 GHz (which are above the threshold of 0.01), the fine reconstruction correctly identifies these signals as spurious and does not include RF content in these bands in the final spectrum. The recovered spectrum over the entire 15 GHz range is shown by way of illustration in FIG. 9. This dual resolution approach correctly identified the two input tones, enabling high resolution spectral analysis across the entire frequency range of the RF spectrum, e.g., 15 GHz range.

Optionally, one or more portions of the invention operate in a standard computing operating environment, for example, a desktop computer, a laptop computer, a mobile computer, a server computer, and the like. Although the invention is described in the general context of program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, autonomous embedded computers, and the like. The invention may also be practiced in distributed computing environments where tasks are performed by remote processing devices that are linked through a communications network. In a distributed computing environment, program modules may be located in both local and remote memory storage devices.

An illustrative operating environment for embodiments of the invention is described as follows. A computer comprises a general purpose desktop, laptop, handheld, mobile or other type of computer (computing device) capable of executing one or more application programs. The computer includes at least one central processing unit ("CPU"), a system memory, including a random access memory ("RAM") and a read-only memory ("ROM"), and a system bus that couples the memory to the CPU. A basic input/output system containing the basic routines that help to transfer information between elements within the computer, such as during startup, is stored in the ROM. The computer further includes a mass storage device for storing an operating system, application programs, and other program modules.

The mass storage device is connected to the CPU through a mass storage controller connected to the bus. The mass storage device and its associated computer-readable media provide non-volatile storage for the computer. Although the description of computer-readable media contained herein refers to a mass storage device, such as a hard disk or CD-ROM drive, it should be appreciated by those skilled in the art that computer-readable media can be any available media that can be accessed or utilized by the computer.

By way of example, and not limitation, computer-readable media comprise computer storage media and communication media. Computer storage media includes non-transitory, non-volatile, removable and non-removable media implemented in any method or technology for storage of information such as computer-readable instructions, data structures, program modules or other data. Such non-transitory computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible non-transitory medium which can be used to store the desired information and which can be accessed by the computer.

According to various embodiments of the invention, the computer may operate in a networked environment using logical connections to remote computers through a network, such as a local network, the Internet, etc. for example. The computer may connect to the network through a network interface unit connected to the bus. It should be appreciated that the network interface unit may also be utilized to connect to other types of networks and remote computing systems.

The computer optionally also include an input/output controller for receiving and processing input from a number of other devices, including a keyboard, mouse, etc. Similarly, an input/output controller may provide output to a display screen, a printer, or other type of output device.

As mentioned briefly above, a number of program modules and data files may be stored in the mass storage device and RAM of the computer, including an operating system suitable for controlling the operation of a networked personal computer. The mass storage device and RAM may also store one or more program modules. In particular, the mass storage device and the RAM may store application programs, such as a software application, for example, a word processing application, a spreadsheet application, a slide presentation application, a database application, etc.

It should be appreciated that various embodiments of the present invention may be implemented as a sequence of computer-implemented acts or program modules running on a computing system and/or as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as described herein.

Although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

As used herein, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed is:

1. An apparatus comprising:
a radio frequency ("RF") spectrum analyzer receiving an RF signal, the RF signal comprising an RF spectrum, said RF spectrum analyzer comprising:
a first modulator encoding the RF signal on an optical carrier, the optical carrier comprising a plurality of sidebands; and
a filter operably coupled with said first modulator and passing therethrough an isolated sideband of the plurality of sidebands;

a Rayleigh-backscatter speckle spectrometer comprising:
a second modulator receiving the isolated sideband and modulating the isolated sideband into alternating short and long; interrogation pulses;
a first amplifier amplifying the modulated, isolated sideband;
an optical fiber receiving the amplified, modulated, isolated sideband, said optical fiber outputting Rayleigh backscattered light propagating through the fiber in a direction opposite to that of the amplified, modulated, isolated sideband;
a first photodetector operably coupled to said optical fiber and collecting therefrom the Raleigh backscattered light in a first polarization, said first photodetector generating a first collected signal; and
a second photodetector operably coupled to said optical fiber and collecting therefrom the Raleigh backscattered light in a second polarization, said second photodetector generating a second collected signal; and
a processor receiving the first collected signal and the second collected signal, and recovering therefrom the RF spectrum.

2. The apparatus according to claim 1, further comprising:
a narrow linewidth laser transmitting the optical carrier to said first modulator.

3. The apparatus according to claim 1, wherein said filter comprises a bandpass filter.

4. The apparatus according to claim 1, wherein said optical fiber comprises one of a single-mode optical fiber and a multi-mode optical fiber.

5. The apparatus according to claim 1, wherein said optical fiber comprises a fiber length,
wherein the short and long; interrogation pulses are separated by a pulse separation corresponding to the fiber length.

6. The apparatus according to claim 1, further comprising:
a second amplifier receiving the Rayleigh backscattered light from said optical fiber and amplifying the Rayleigh backscattered light.

7. The apparatus according to claim 6, wherein said first amplifier and said second amplifier comprise erbium-doped fiber amplifiers.

8. The apparatus according to claim 1, further comprising:
a circulator coupled to said optical fiber, the Rayleigh backscattered light generated in the fiber being coupled out of said fiber; and
a polarizing beam splitter coupled to the circulator, said polarizing beam splitter receiving the Rayleigh backscattered light from the circulator, said polarizing beam splitter transmitting light with a first polarization to said first photodetector, and said polarizing beam splitter transmitting light with a second polarization to said second photodetector.

9. The apparatus according to claim 1, wherein said processor recovers the RF spectrum from the first collected signal and the second collected signal using compressed sensing.

10. The apparatus according to claim 9, wherein the first collected signal comprises first short pulse data and first long pulse data,
wherein the second collected signal comprises second short pulse data and second long pulse data,
wherein said processor recovers the RF spectrum by:

recovering a coarse resolution spectrum from the first short pulse data and the second short pulse data; and recovering a fine resolution spectrum from the first long pulse data and the second long pulse data based on the recovered coarse resolution spectrum, the fine resolution spectrum being the recovered RF spectrum.

11. A method comprising:

providing a radio frequency ("RF") spectrum analyzer receiving an RF signal, the RF signal comprising at least one RF tone and an RF spectrum, the RF spectrum including an RF frequency range, the RF spectrum analyzer comprising:

a Rayleigh-backscatter speckle spectrometer; and a processor communicating with the Rayleigh-backscatter speckle spectrometer and recovering the RF spectrum;

initializing the RF spectrum analyzer by measuring a plurality of initial speckle intensity patterns across the RF frequency range;

measuring a calibration speckle intensity pattern generated by a single calibration frequency in the RF spectrum, using the processor;

comparing the calibration speckle intensity pattern to the plurality of initial speckle intensity patterns to determine an optical frequency shift, using the processor; and recalibrating the RF spectrum analyzer by shifting the recovered RF spectrum by a frequency equal to the optical frequency shift, using the processor.

12. The method according to claim 11, wherein the RF spectrum analyzer further comprises:

a first modulator encoding the RF signal, the encoded RF signal comprising a plurality of sidebands; and a filter operably coupled with the first modulator and passing therethrough an isolated sideband of the plurality of sidebands, wherein the Rayleigh-backscatter speckle spectrometer comprises:

a second modulator receiving the isolated sideband and modulating the isolated sideband into alternating short and long; interrogation pulses;

a first amplifier amplifying the modulated, isolated sideband;

an optical fiber receiving the amplified, modulated, isolated sideband, said optical fiber outputting Rayleigh backscattered light propagating through the fiber in a direction opposite to that of the amplified, modulated, isolated sideband;

a first photodetector operably coupled to the optical fiber and collecting therefrom the Raleigh backscattered light in a first polarization, the first photodetector generating a first collected signal; and a second photodetector operably coupled to the optical fiber and collecting therefrom the Raleigh backscattered light in a second polarization, the second photodetector generating a second collected signal, wherein the processor receives the first collected signal and the second collected signal, and recovers therefrom the RF spectrum.

13. A method comprising:

providing a radio frequency ("RF") spectrum analyzer receiving simultaneously an RF signal and a calibration signal, the RF signal comprising at least one RF tone and an RF spectrum, the RF spectrum including an RF frequency range, the calibration signal comprising a single calibration frequency, the RF spectrum analyzer comprising:

a Rayleigh-backscatter speckle spectrometer; and a processor communicating with the Rayleigh-backscatter speckle spectrometer and recovering the RF spectrum;

initializing the RF spectrum analyzer by measuring a plurality of initial speckle intensity patterns across the RF frequency range;

measuring a calibration speckle intensity pattern generated by the single calibration frequency in the RF spectrum;

comparing the calibration speckle intensity pattern to the plurality of initial speckle intensity patterns to determine an optical frequency shift; and recalibrating the RF spectrum analyzer by shifting the recovered RF spectrum to compensate for the optical frequency shift, using the processor.

14. The method according to claim 13, wherein the RF spectrum analyzer further comprises:

a first modulator encoding the RF signal, the encoded RF signal comprising a plurality of sidebands; and a filter operably coupled with the first modulator and passing therethrough an isolated sideband of the plurality of sidebands, wherein the Rayleigh-backscatter speckle spectrometer comprises:

a second modulator receiving the isolated sideband and modulating the isolated sideband into alternating short and long, interrogation pulses;

a first amplifier amplifying the modulated, isolated sideband;

an optical fiber receiving the amplified, modulated, isolated sideband, said optical fiber outputting Rayleigh backscattered light propagating through the fiber in a direction opposite to that of the amplified, modulated, isolated sideband;

a first photodetector operably coupled to the optical fiber and collecting therefrom the Raleigh backscattered light in a first polarization, the first photodetector generating a first collected signal; and a second photodetector operably coupled to the optical fiber and collecting therefrom the Raleigh backscattered light in a second polarization, the second photodetector generating a second collected signal, wherein the processor receives the first collected signal and the second collected signal, and recovers therefrom the RF spectrum.

* * * * *